United States Patent
Kojima et al.

(10) Patent No.: US 8,315,677 B2
(45) Date of Patent: Nov. 20, 2012

(54) FOLDING MOBILE PHONE

(75) Inventors: Takuya Kojima, Saitama (JP); Shinya Nakamura, Saitama (JP)

(73) Assignee: NEC Corporation, Tokyo (JP)

( * ) Notice: Subject to any disclaimer, the term of this patent is extended or adjusted under 35 U.S.C. 154(b) by 787 days.

(21) Appl. No.: 11/908,356

(22) PCT Filed: Apr. 10, 2006

(86) PCT No.: PCT/JP2006/307550
§ 371 (c)(1),
(2), (4) Date: Sep. 11, 2007

(87) PCT Pub. No.: WO2006/109764
PCT Pub. Date: Oct. 19, 2006

(65) Prior Publication Data
US 2009/0054113 A1    Feb. 26, 2009

(30) Foreign Application Priority Data
Apr. 12, 2005    (JP) ................. 2005-114731

(51) Int. Cl.
*H04M 1/00* (2006.01)
(52) U.S. Cl. .................. 455/575.3; 455/90.3
(58) Field of Classification Search ........... 455/550.1, 455/562.1, 575.1, 575.3, 575.5, 575.7, 90.3
See application file for complete search history.

(56) References Cited

U.S. PATENT DOCUMENTS

| | | | |
|---|---|---|---|
| 7,031,744 B2 * | 4/2006 | Kuriyama et al. | 455/550.1 |
| 7,079,877 B2 * | 7/2006 | Shoji et al. | 455/575.5 |
| 7,343,183 B2 * | 3/2008 | Iguchi | 455/575.7 |
| 7,502,637 B2 * | 3/2009 | Mori | 455/575.7 |
| 2002/0169010 A1 | 11/2002 | Shoji et al. | |
| 2004/0198248 A1 * | 10/2004 | Krenz et al. | 455/90.1 |
| 2004/0219956 A1 * | 11/2004 | Iwai et al. | 455/575.3 |
| 2005/0239519 A1 * | 10/2005 | Saitou et al. | 455/575.1 |

FOREIGN PATENT DOCUMENTS

| | | |
|---|---|---|
| EP | 1258943 | 11/2002 |
| EP | 1538694 | 6/2005 |
| JP | 63-161701 A | 7/1988 |
| JP | 2002-27066 A | 1/2002 |
| JP | 2002-335180 A | 11/2002 |
| JP | 2004-201179 A | 7/2004 |
| JP | 2004-229048 A | 8/2004 |
| WO | 2004010530 | 1/2004 |

* cited by examiner

*Primary Examiner* — Ping Hsieh
(74) *Attorney, Agent, or Firm* — Sughrue Mion, PLLC

(57) ABSTRACT

A folding mobile phone is provided that improves the antenna characteristics of both of a main antenna and a sub-antenna. The folding mobile phone comprises at least an upper housing 1, a lower housing 2, a hinge unit 3, a main antenna 4 located in the vicinity of the hinge unit 3 of the lower housing 2, a sub-antenna 5 located at the lower end of the lower housing 2, and a control unit for selecting an antenna to be used, the folding mobile phone comprising: an upper-and-lower-connections switching circuit 10 for connecting to a lower circuit board 7; and an upper-and-lower-boards connecting means 9 for connecting an upper circuit board 6 with the upper-and-lower-connections switching circuit 10, wherein, at the upper-and-lower-connections switching circuit 10, an electrical connection state between the upper circuit board 6 and the lower circuit board 7 is switched by turning the PIN diode on and off based on the antenna selection signal from the control unit. This provides an appropriate connection state for the selected antenna and thus improves the antenna characteristics of both antennas.

1 Claim, 4 Drawing Sheets

F I G. 1
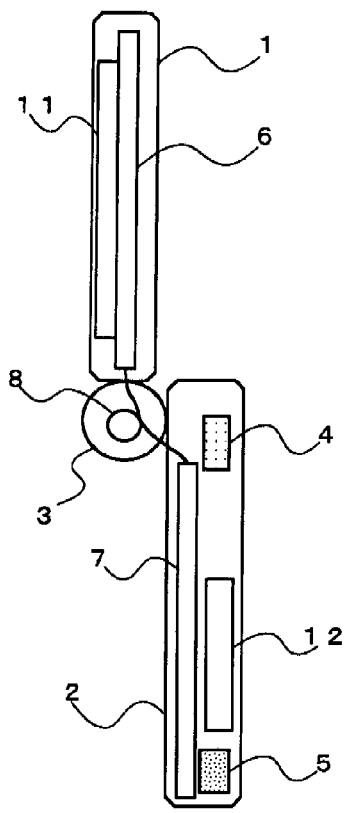
F I G. 2
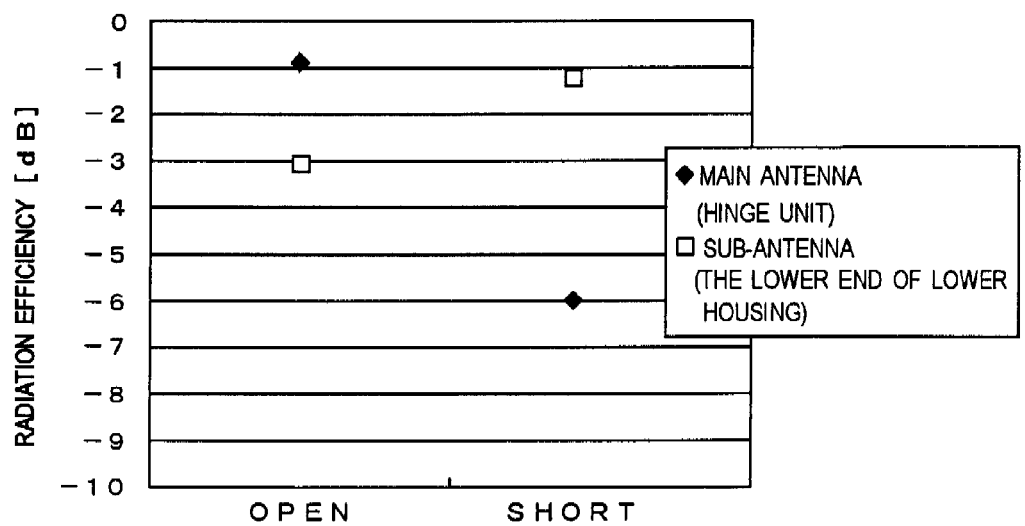
ELECTRICAL CONNECTION STATES OF UPPER CIRCUIT BOARD AND LOWER CIRCUIT BOARD F I G. 5
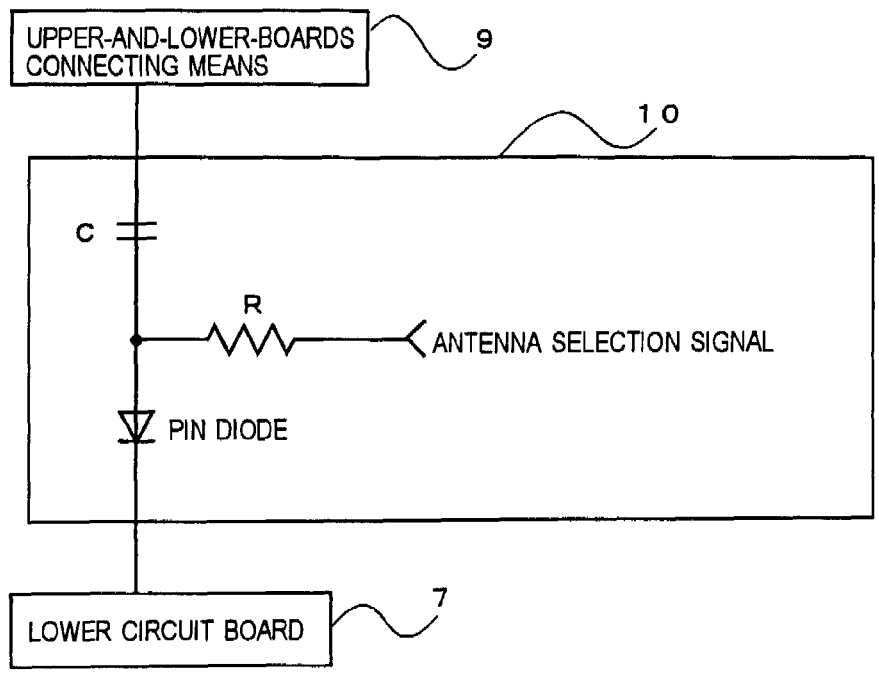
F I G. 6
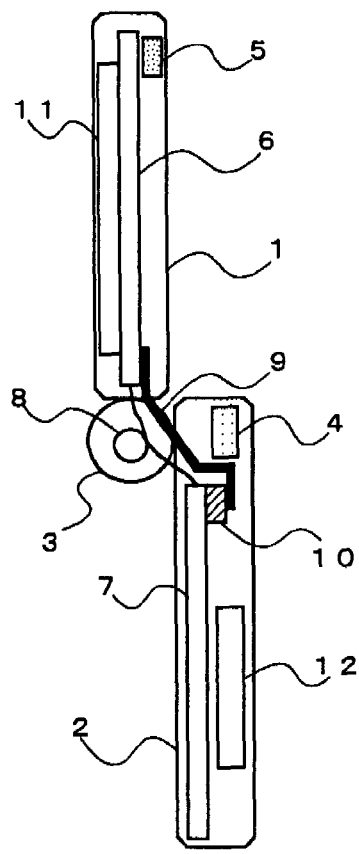

ELECTRICAL CONNECTION STATES OF UPPER CIRCUIT BOARD AND LOWER CIRCUIT BOARD

FOLDING MOBILE PHONE

TECHNICAL FIELD

The present invention pertains to a folding mobile phone and in particular to a folding mobile phone with two antennas, a main antenna and a sub-antenna.

BACKGROUND ART

Recent mobile phones are often equipped with two antennas, a main antenna and a sub-antenna, to ensure their telephone conversation quality. An advantage of being equipped with two antennas is to prevent degradation of telephone conversation quality using the other antenna even if the user touches one antenna, which would otherwise result in the degradation of the telephone conversation quality.

An example of the folding mobile phone equipped with such two antennas is illustrated in FIG. 1.

The conventional folding mobile phone illustrated in FIG. 1 comprises an upper housing 1, a lower housing 2, a hinge unit 3, a main antenna 4 located in the vicinity of the hinge unit 3 of the lower housing 2, and a sub-antenna 5 located at the lower end of the lower housing 2. In addition, the upper housing 1 contains an upper circuit board 6, a display 11, etc., while the lower housing 2 contains a main antenna 4, a sub-antenna 5, a lower circuit board 7, a battery 12, etc.

For example, for such configured folding mobile phone, Patent Document 1 discloses a method for ensuring characteristics of the main antenna 4 located at the hinge unit 3. In this document, the case material of both of the upper housing 1 and the lower housing 2 is composed of an insulation material such as mold. In addition, an upper-and-lower-circuits connecting unit 8, which connects the upper circuit board 6 with the lower circuit board 7, is located at and wound once around the hinge unit 3, so that it has an inductance and reduces the amount of high-frequency current that flows between the upper circuit board 6 and the lower circuit board 7, thereby electrically separating the upper circuit board 6 from the lower circuit board 7.

[Patent Document 1]: Japanese Patent Laid-Open No. 2002-27066 (pages 8-13 and FIG. 1)

While it is possible to ensure the antenna characteristics in the above method in case of the antennas that are mounted in the vicinity of the hinge unit, the characteristics of the sub-antenna that is located at the end opposite to the hinge unit would not necessarily be optimized in the condition where the upper circuit board and the lower circuit board are electrically separated from each other.

FIG. 2 illustrates the antenna characteristics (radiation characteristics) of each of the main antenna that is located in the vicinity of the hinge unit of the lower housing and the sub-antenna that is located at the end opposite to the hinge unit of the lower housing in the following cases: when an electrical connection state between the upper circuit board and the lower circuit board is OPEN (unconnected); and when it is SHORT (connected). As illustrated, it can be seen that the main antenna that is located in the vicinity of the hinge unit will yield better characteristics in OPEN, while the sub-antenna that is located at the end opposite to the hinge unit will yield better characteristics in SHORT.

In the conventional folding mobile phones, however, the electrical connection state between the upper circuit board and the lower circuit board is often maintained in OPEN due to the design in favor of the characteristics of the main antenna located in the vicinity of the hinge unit. In such a connection state, the sub-antenna characteristics could no longer be improved and problems could arise that cause the degradation of telephone conversation quality when the sub-antenna is used.

The present invention is provided in view of the above problems, and a main object thereof is to provide a folding mobile phone that may improve the antenna characteristics of both of a main antenna and a sub-antenna.

DISCLOSURE OF THE INVENTION

In order to achieve the above object, a folding mobile phone in accordance with the present invention comprising at least an upper housing, a lower housing, a hinge unit for openably and closably connecting the upper housing with the lower housing, first and second antennas, and control means for selecting an antenna to be used and transmitting an antenna selection signal, the folding mobile phone comprising: switching means for connecting to one of a component at the upper housing or a component at the lower housing; and connecting means for connecting the other of the component at the upper housing or the component at the lower housing with the connection switching means, wherein, at the switching means, an electrical connection state between the component at the upper housing and the component at the lower housing is switched on the basis of the antenna selection signal.

In the present invention, the first antenna may be configured to be located in the vicinity of the hinge unit of one housing, and the second antenna to be located at a position spaced from the hinge unit of the one housing.

In the present invention, the first antenna may also be configured to be located in the vicinity of the hinge unit of one housing, and the second antenna to be located at a position spaced from the hinge unit of the other housing.

In addition, preferably in the present invention, the switching means, when the first antenna is used, electrically separates the component at the upper housing from the component at the lower housing, and when the second antenna is used, electrically connects the component at the upper housing and the component at the lower housing.

Further, in the present invention, the switching means may be configured to include a condenser and a PIN diode, and to use the condenser to change an electrical connection state by performing ON/OFF control of the PIN diode based on the antenna selection signal.

Thus, in the present invention, the antenna characteristics of both of the main antenna and the sub-antenna are improved because the electrical connection state between a component at the upper housing and a component at the lower housing is changed depending on the antenna to be used.

As described above, in accordance with the folding mobile phone of the present invention, the characteristics of both of the main antenna and the sub-antenna are improved.

This is because the folding mobile phone, which comprises two antennas, a main antenna and a sub-antenna, and a control unit for selecting an antenna to be used, is equipped with an upper-and-lower-connections switching circuit that switches an electrical connection state between the component at the upper housing and the component at the lower housing based on the antenna selection signal transmitted by the control unit, thereby providing an appropriate connection state for the selected antenna.

BRIEF DESCRIPTION OF THE DRAWINGS

FIG. 1 illustrates a configuration of a conventional folding mobile phone;

FIG. 2 is a diagram (graph) illustrating a relationship between the electrical connection states and the radiation efficiency for the upper circuit board and the lower circuit board of a folding mobile phone in accordance with a first exemplary embodiment of the present invention;

FIG. 5 is a circuit diagram illustrating a configuration of an upper-and-lower-connections switching circuit of the folding mobile phone in accordance with the first exemplary embodiment of the present invention;

FIG. 6 is a side view schematically illustrating a configuration of a folding mobile wireless device in accordance with a second exemplary embodiment of the present invention;

DESCRIPTION OF SYMBOLS

Figure 3:
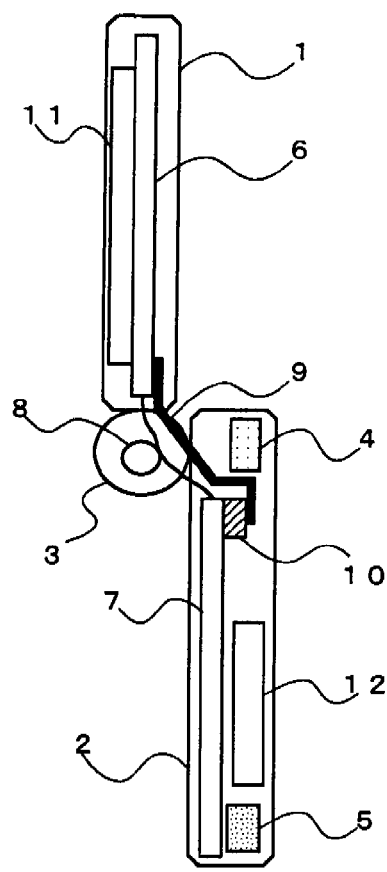
FIG. 3 is a side view schematically illustrating a configuration of the folding mobile wireless device in accordance with the first exemplary embodiment of the present invention.

1 Upper housing
2 Lower housing
3 Hinge unit
4 Main antenna
5 Sub-antenna
6 Upper circuit board
7 Lower circuit board
8 Upper-and-lower-circuits connecting unit
9 Upper-and-lower-boards connecting means
10 Upper-and-lower-connections switching circuit
11 Display
12 Battery

BEST MODE FOR CARRYING OUT THE INVENTION

In accordance with a preferred embodiment, the present invention provides a folding mobile phone comprising at least an upper housing, a lower housing, a hinge unit, a main antenna located in the vicinity of the hinge unit of the upper housing or the lower housing, a sub-antenna located at a position spaced from the hinge unit of the upper housing or the lower housing, and a control unit for selecting an antenna to be used and transmitting an antenna selection signal, the folding mobile phone comprising: an upper-and-lower-connections switching circuit for connecting to one of a component at the upper housing and a component at the lower housing (e.g., a lower circuit board); and an upper-and-lower-boards connecting means for connecting the other of the component at the upper housing and the component at the lower housing (e.g., an upper circuit board) with the upper-and-lower-connections switching circuit, wherein, at the upper-and-lower-connections switching circuit, control is performed such that an electrical connection state between the component at the upper housing and the component at the lower housing is switched by, e.g., turning a PIN diode on and off based on the antenna selection signal transmitted by the control unit. This configuration provides an appropriate connection state for the selected antenna and thus improves the antenna characteristics of both of the main antenna and the sub-antenna.

[First Exemplary Embodiment]

Figure 4:
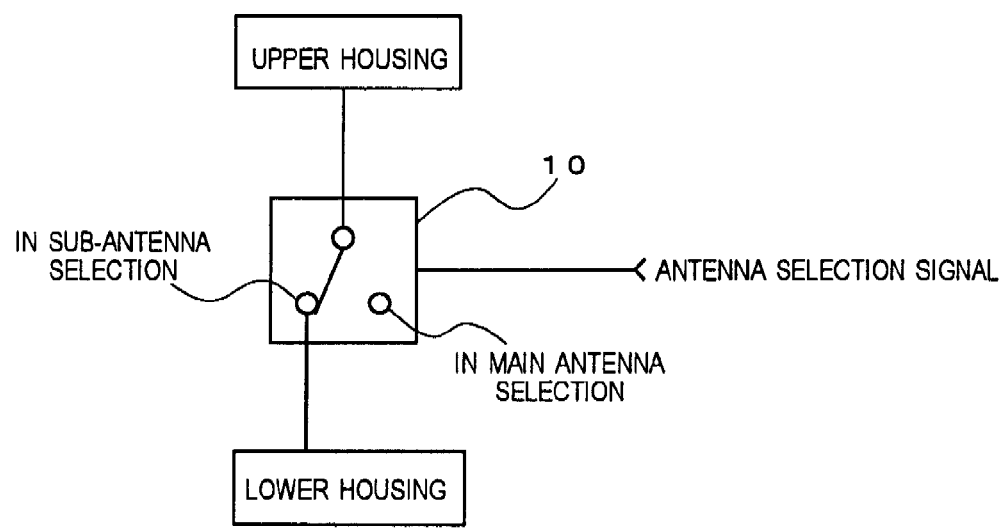
FIG. 4 is a block diagram schematically illustrating the connection switching operation of the folding mobile phone in accordance with the first exemplary embodiment of the present invention.

For a detailed description, reference is now made to FIG. 2 through FIG. 5 to illustrate the folding mobile phone in accordance with a first exemplary embodiment of the present invention. FIG. 3 is a side view schematically illustrating a configuration of the folding mobile phone in accordance with the first exemplary embodiment of the present invention; and FIG. 2 is a diagram illustrating a relationship between the electrical connection states for the upper circuit board and the lower circuit board and the radiation efficiency of the antennas. FIG. 4 is a block diagram schematically illustrating the operation of an upper-and-lower-connections switching circuit; and FIG. 5 is a circuit diagram specifically illustrating a configuration of the upper-and-lower-connections switching circuit.

As illustrated in FIG. 3, the folding mobile phone in accordance with this embodiment comprises: an upper housing 1; a lower housing 2; a hinge unit 3; a main antenna 4 located in the vicinity of the hinge unit 3 of the lower housing 2, a sub-antenna 5 located at a position spaced from the hinge unit 3 of the lower housing 2 (e.g., at the lower end of the lower housing 2), a control unit (not shown) for selecting an antenna to be used and transmitting an antenna selection signal; an upper-and-lower-circuits connecting unit 8; an upper-and-lower-boards connecting unit 9; and an upper-and-lower-connections switching circuit 10. In addition, the folding mobile phone of this example forms the case material of the upper housing 1 and the lower housing 2 with a mold. Further, the upper-and-lower-circuits connecting unit 8, which connects the upper circuit board 6 with the lower circuit board 7, is configured to be located at and wound once around the hinge unit 3, so that it has an inductance and reduces the amount of high-frequency current that flows between the upper circuit board 6 and the lower circuit board 7, thereby electrically separating the upper circuit board 6 from the lower circuit board 7.

In addition, the upper housing 1 contains an upper circuit board 6, a display 11, etc., while the lower housing 2 contains a main antenna 4, a sub-antenna 5, a lower circuit board 7, a battery 12, and so on. The lower circuit board 7 is provided with a control unit for comparing reception levels immediately before a telephone conversation slot, selecting the antenna with the higher reception level, and performing communications control. The upper-and-lower-boards connecting unit 9 is configured to connect to the upper circuit board 6 at one end and to the upper-and-lower-connections switching circuit 10 at the other end. The upper-and-lower-connections switching circuit 10 is located between the upper-and-lower-boards connecting unit 9 and the lower circuit board 7, each configured to connect to each other through a PIN diode that is located on the upper-and-lower-connections switching circuit 10. Further, each antenna is powered through the connection of a radio unit with each antenna, both mounted on the lower circuit board 7, via a power tap (not shown).

However, the configuration of FIG. 3 is merely illustrative, and especially, the material and configuration of each housing, components therein, their arrangement and the configuration of the hinge unit 3 are not so limited. In addition, although, in FIG. 3, the upper-and-lower-boards connecting unit 9 connects the upper circuit board 6 with the lower circuit board 7 through the upper-and-lower-connections switching circuit 10, any configuration may be used that connects at least one of the components at the upper housing 1 (the upper housing 1 itself or a part contained in the upper housing 1) with at least one of the components at the lower housing 2 (the lower housing 2 itself or a part contained in the lower housing 2) through the upper-and-lower-connections switching circuit 10.

FIG. 4 is a block diagram illustrating the switching between a component at the upper housing 1 (here, the upper circuit board 6) and a component at the lower housing (here, the lower circuit board 7). The switching of a switch is performed by an antenna selection signal from the control unit. Specifically, when the main antenna 4 is selected, the upper circuit board 6 and the lower circuit board 7 are configured to be electrically separated from each other, and when the sub-antenna 5 is selected, the upper circuit board 6 and the lower circuit board 7 are configured to be electrically connected to each other. In the present invention, the above switching of connections is performed with the upper-and-lower-connections switching circuit 10. The upper-and-lower-connections switching circuit 10 is specifically described below.

FIG. 5 is a diagram illustrating a configuration of the upper-and-lower-connections switching circuit 10. The upper-and-lower-connections switching circuit 10 switches a connection state between the upper circuit board 6 (the upper-and-lower-boards connecting unit 9) and the lower circuit board 7 by turning the PIN diode on and off. It is also assumed that the antenna selection signal is setup to output a "Low" when the main antenna 4 is selected and to output a "High" when the sub-antenna 5 is selected.

The operation of the upper-and-lower-connections switching circuit 10 is as follows: When the main antenna 4 is selected, a "Low" of the antenna selection signal is output from the control unit so that the PIN diode is turned OFF. On the other hand, when the sub-antenna 5 is selected, a "High" of the antenna selection signal is output from the control unit so that the PIN diode is turned ON.

In addition, focusing on the antenna characteristics, the characteristics change depending on the electrical connection states between the upper circuit board 6 and the lower circuit board 7. FIG. 2 is a diagram illustrating a relationship between the electrical connection states for the upper circuit board 6 and the lower circuit board 7 and the radiation efficiency of the antennas when the antennas are located at the positions indicated in the first exemplary embodiment. As illustrated in FIG. 2, the main antenna 4 that is located in the vicinity of the hinge unit 3 yields better characteristics when the electrical connection between the upper circuit board 6 and the lower circuit board 7 is OPEN, while the sub-antenna 5 that is located at the lower end of the lower housing 2 yields better characteristics when the electrical connection between the upper circuit board 6 and the lower circuit board 7 is SHORT.

That is, good antenna characteristics are obtained by performing control such that, when the main antenna 4 is used, the PIN diode in the upper-and-lower-connections switching circuit 10 is turned off and the upper circuit board 6 and the lower circuit board 7 are electrically separated from each other, and that, when the sub-antenna 5 is used, the PIN diode is turned on and the upper circuit board 6 and the lower circuit board 7 are electrically connected to each other.

In this way, by turning the PIN diode on and off, the electrical connection between the component at the upper housing 1 (the upper circuit board 6) and the components at the lower housing 2 (the lower circuit board 7) is changed, thereby obtaining good antenna characteristics for both of the main antenna 4 and the sub-antenna 5.

[Second Exemplary Embodiment]

Figure 7:
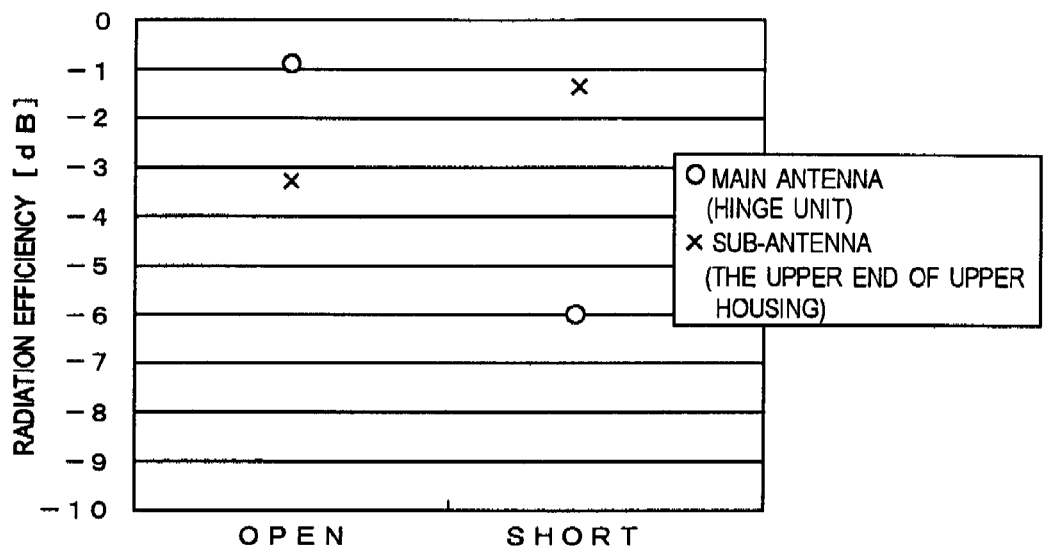
FIG. 7 is a diagram (graph) illustrating a relationship between the electrical connection states and the radiation efficiency for the upper circuit board and the lower circuit board of the folding mobile phone in accordance with the second exemplary embodiment of the present invention.
Figure 8:
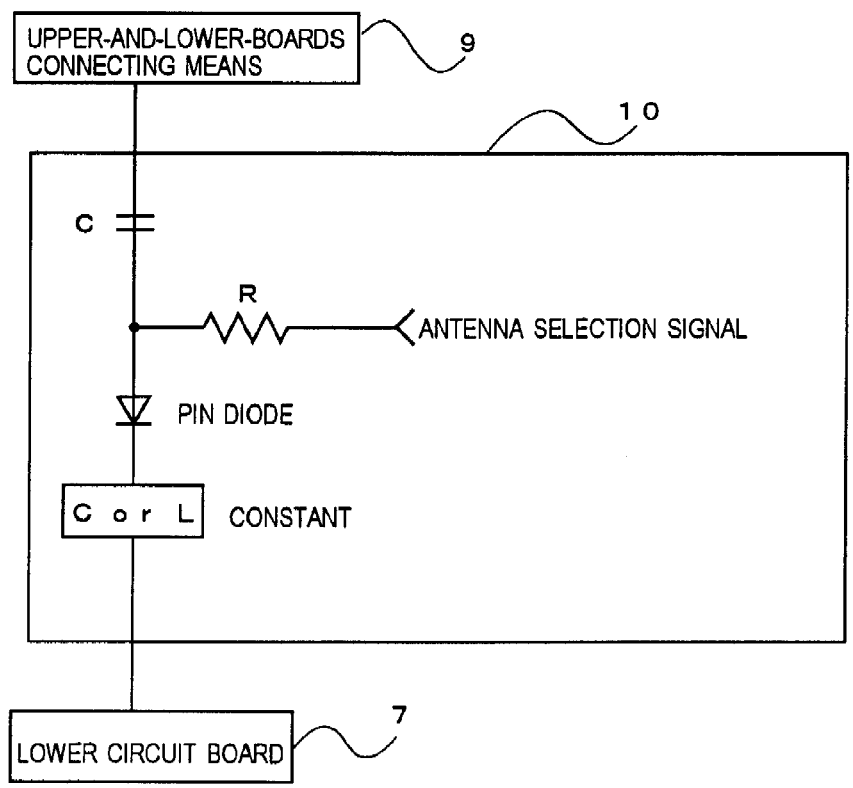
FIG. 8 is a circuit diagram illustrating a configuration of an upper-and-lower-connections switching circuit of the folding mobile wireless device in accordance with the second exemplary embodiment of the present invention.

Reference is now made to FIG. 6 through FIG. 8 to illustrate a folding mobile phone in accordance with a second exemplary embodiment of the present invention. FIG. 6 is a side view schematically illustrating a configuration of the folding mobile phone in accordance with the second exemplary embodiment of the present invention; and FIG. 7 is a diagram illustrating a relationship between the electrical connection states for the upper circuit board and the lower circuit board and the radiation efficiency of the antennas. In addition, FIG. 8 is a circuit diagram specifically illustrating a configuration of the upper-and-lower-connections switching circuit.

As illustrated in FIG. 6, in the folding mobile phone of this embodiment, the main antenna 4 is located in the vicinity of the hinge unit 3 of the lower housing 2, and the sub-antenna 5 is located at a position spaced from the hinge unit 3 of the upper housing 1 (e.g., at the upper end of the upper housing 1). Other configurations are similar to that of the first exemplary embodiment.

FIG. 7 is a diagram illustrating a relationship between the electrical connection states for the upper circuit board 6 and the lower circuit board 7 and the radiation efficiency of the antennas when the antennas are located at the positions indicated in the second exemplary embodiment. As illustrated in FIG. 7, the main antenna 4 that is located in the vicinity of the hinge unit 3 of the lower housing 2 yields better characteristics when the electrical connection between the upper circuit board 6 and the lower circuit board 7 is OPEN, while the sub-antenna 5 that is located at the end opposite to the hinge unit 3 of the upper housing 1 yields better characteristics when the electrical connection between the upper circuit board 6 and the lower circuit board 7 is SHORT.

Thus, good antenna characteristics are obtained by performing control such that, when the main antenna 4 is used, the PIN diode in the upper-and-lower-connections switching circuit 10 is turned off and the upper circuit board 6 and the lower circuit board 7 are electrically separated from each other, and that, when the sub-antenna 5 is used, the PIN diode is turned on and the upper circuit board 6 and the lower circuit board 7 are electrically connected to each other.

In this way, good antenna characteristics are obtained by turning the PIN diode on and off, even if the main antenna 4 is located in the vicinity of the hinge unit 3 of the lower housing 2 and the sub-antenna 5 is located at the end opposite to the hinge unit 3 of the upper housing 1.

FIG. 8 is a diagram illustrating a configuration of the upper-and-lower-connections switching circuit 10 when a constant is located in the upper-and-lower-connections switching circuit 10 and the impedance is changed by that constant. As illustrated, when the PIN diode is turned on, the constant located in the upper-and-lower-connections switching circuit 10 is seen and thus the connection impedance changes. In this way, the connection impedance between the upper circuit board 6 and the lower circuit board 7 are changed with a constant and an appropriate impedance condition is provided for the positions of the antennas.

In addition, although, in each of the exemplary embodiments mentioned above, the electrical connection states between the component at the upper housing 1 (the upper circuit board 6) and the component at the lower housing 2 (the lower circuit board 7) were changed by turning the PIN diode on and off based on the antenna selection signals, the present invention is not intended to be limited to such exemplary configurations and may be of any configuration that would be able to electrically separate a component at the upper housing 1 from a component at the lower housing 2 when the main antenna 4 is used, and to connect a component at the upper housing 1 with a component at the lower housing 2 when the sub-antenna 5 is used.

Further, although, in the first exemplary embodiment, the lower housing 2 is configured to comprise the main antenna 4 and the sub-antenna 5, and, in the second exemplary embodiment, the lower housing 2 is configured to comprise the main antenna 4 and the upper housing 1 is configured to comprise the sub-antenna 5, the present invention may be equally applied to any structure that comprises one antenna in the vicinity of the hinge unit 3 and the other antenna at a position spaced from the hinge unit 3.

Moreover, although, in the embodiments mentioned above, the PIN diode is turned on and off by the antenna selection signals, it is also possible, for example, to change the connection depending on whether the folding mobile phone is in an expanded configuration or in a folded configuration by providing opening-closing state detection unit at the upper-and-lower-connections switching circuit 10 for detecting an opening-closing state of the upper housing 1 and the lower housing 2, and combining opening-closing detection signals from that opening-closing state detection unit.

INDUSTRIAL APPLICABILITY

The present invention is not limited to mobile phones and may be applied to any communication equipment that comprises a main antenna and a sub-antenna.

The invention claimed is:
1. A folding mobile phone comprising:
an upper housing;
a lower housing;
a hinge unit which connects the upper housing and the lower housing;
a first antenna disposed in the upper housing;
a second antenna disposed in the lower housing;
a control unit configured to select one of the first antenna and the second antenna to be used and to transmit an antenna selection signal;
wherein, the control unit controls to electrically connect and electrically disconnect a component in the upper housing with a component in the lower housing based on the antenna selection signal, such that when the antenna selection signal indicates selection of the second antenna, the control unit controls to electrically connect the component in the upper housing to the component in the lower housing, and when the antenna selection signal indicates selection of the first antenna, the control unit controls to electrically disconnect the component in the upper housing from the component in the lower housing.

* * * * *